June 30, 1970

J. H. WAGNER 3,517,541

WHEEL FABRICATING MACHINE WITH LOADER AND UNLOADER APPARATUS

Filed Sept. 20, 1965

INVENTOR.
JAMES H. WAGNER
BY
M. A. Hobbs
ATTORNEY

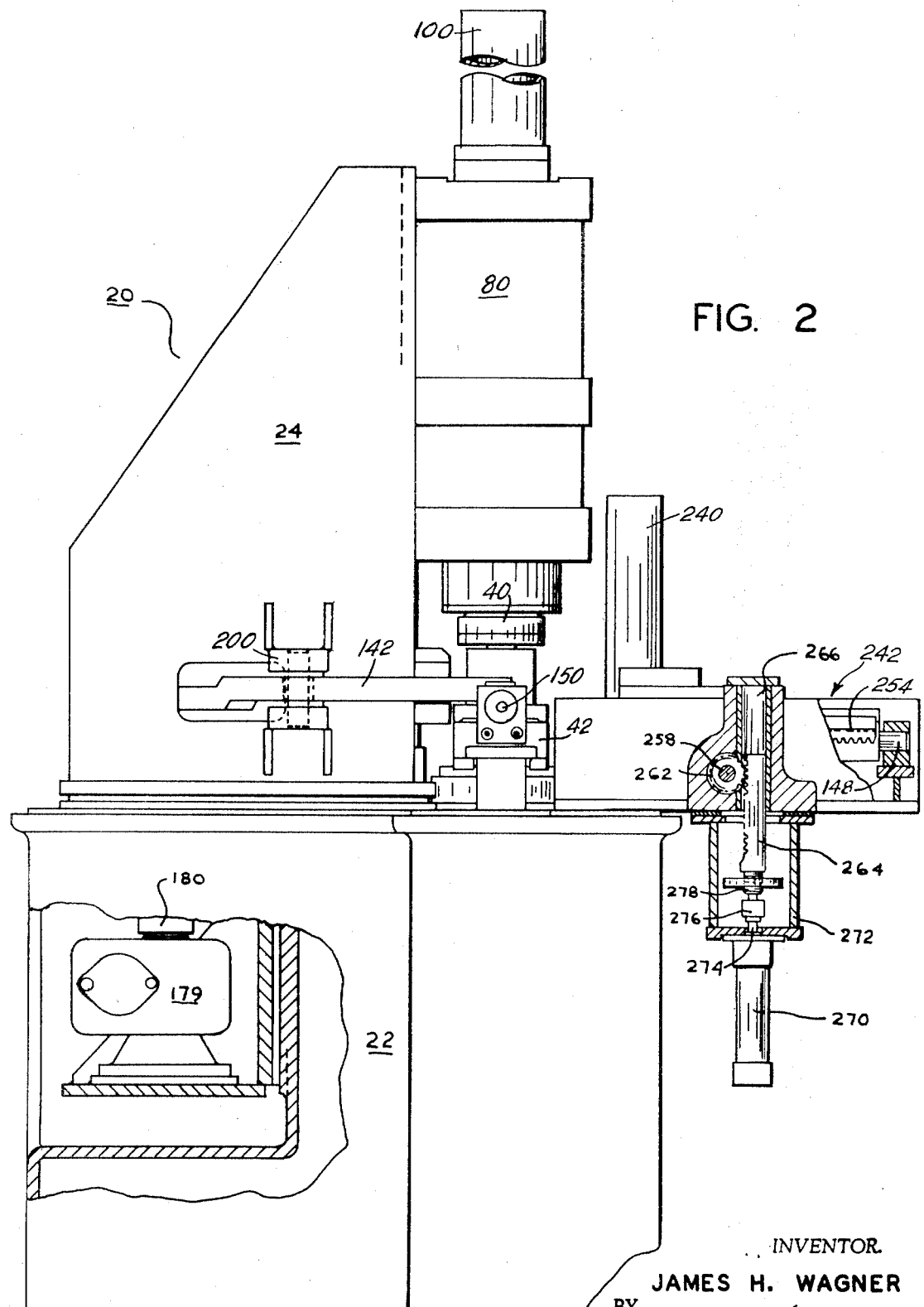

INVENTOR.
JAMES H. WAGNER
BY
M. A. Hobbs
ATTORNEY

INVENTOR.
JAMES H. WAGNER
BY
ATTORNEY

INVENTOR.
JAMES H. WAGNER
BY
M. A. Hobbs
ATTORNEY

June 30, 1970  J. H. WAGNER  3,517,541
WHEEL FABRICATING MACHINE WITH LOADER AND UNLOADER APPARATUS
Filed Sept. 20, 1965  7 Sheets-Sheet 7

INVENTOR.
JAMES H. WAGNER
BY
*m.a.Hobbs*
ATTORNEY

United States Patent Office

3,517,541
Patented June 30, 1970

3,517,541
WHEEL FABRICATING MACHINE WITH LOADER AND UNLOADER APPARATUS
James H. Wagner, Muncie, Ind., assignor to Arrowhead Engineering Corporation, Knox, Ind., a corporation of Indiana
Filed Sept. 20, 1965, Ser. No. 488,651
Int. Cl. B21d 45/00
U.S. Cl. 72—426                                                4 Claims

ABSTRACT OF THE DISCLOSURE

A mechanism for inserting a blank into a pulley fabricating machine and for removing the form blanked therefrom, in which a carriage conveys a blank between a magazine and a spindle where the pulley is formed and a carriage having a magnet thereon removes the formed blank from between the spindles to a discharge station. A collar may be used around one of the spindles to disengage the formed blank from the spindle.

---

Pulleys and sheaves have been made in the past by splitting the peripheral edge of disc-shaped metal blanks which are usually pre-formed to a special configuration to provide a hub of greater thickness of material away from the periphery, and attempts have been made to produce this type of pulley or sheave from flat, disc-shaped blanks. The prior methods and machines have generally not been successful commercially in producing satisfactory pulleys and sheaves in that the tolerances have been difficult to maintain; the pressures of the splitting tool have often been of such magnitude that the blank from which the pulley or sheave was being made was damaged in the operation, rendering the final product unacceptable; and the essential parts of the machine for fabricating the pulleys or sheaves have had only a limited life under the high pressures to which they have been subjected in operation, thus requiring expensive replacement of parts and extensive down-time of the machines. These inherent difficulties in the prior machines and methods have rendered this type of pulley or sheave too costly for, and hence not competitive with, the mass produced pulleys and sheaves of the automotive and appliance fields. A machine has been developed which has overcome the foregoing difficulties and which can produce satisfactory sheaves over long periods of time, and the present invention is directed principally to the loading and unloading of this and similar machines efficiently and easily so that the fabricating operation can be performed without interruption for extended periods of time.

Another object of the invention is to provide a machine for producing pulleys and sheaves of the aforesaid type which will automatically feed the blanks into the machine, performing the splitting, spreading and reforming operation, and ejecting the finished pulley or sheave, and which will operate to perform the foregoing steps with little or no attention from the operator.

A further object is to provide an apparatus for use with a machine of the aforementioned type, which easily and readily sets up for feeding and producing pulleys or sheaves and which can be easily changed to produce a different pulley or sheave of different size and shape, without disassembling any major part of the machine and without involving any substantial down-time.

Additional objects and advantages of the invention will become apparent from the following description and accompanying drawings, wherein:

FIG. 2 is a side elevational and partial cross sectional view of the machine shown in FIG. 1, the section being taken on line 2—2 of FIG. 1;

Figure 9:
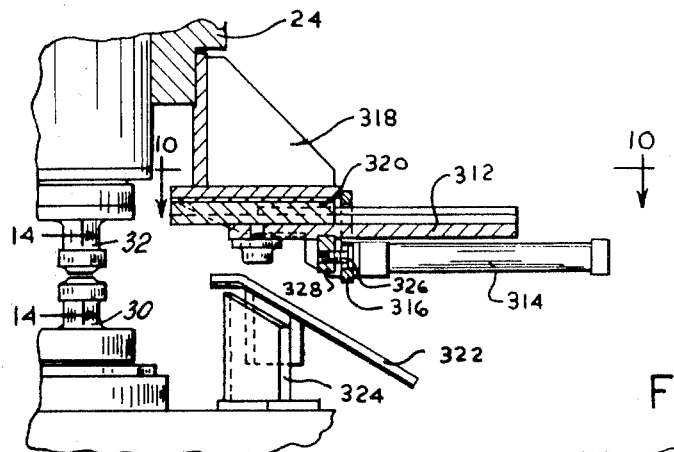
FIG. 9 is a fragmentary elevational and partial cross sectional view of a portion of the operating mechanism, the section being taken on line 9—9 of FIG. 1.
Figure 13:
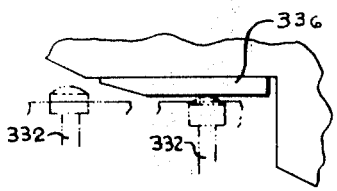
Figure 11:
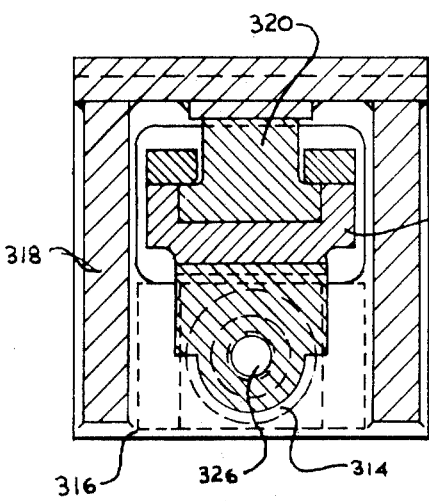
FIG. 11 is a vertical cross sectional view of the mechanism shown in FIGS. 9 and 10, the section being taken on line 11—11 of FIG. 10.
Figure 12:
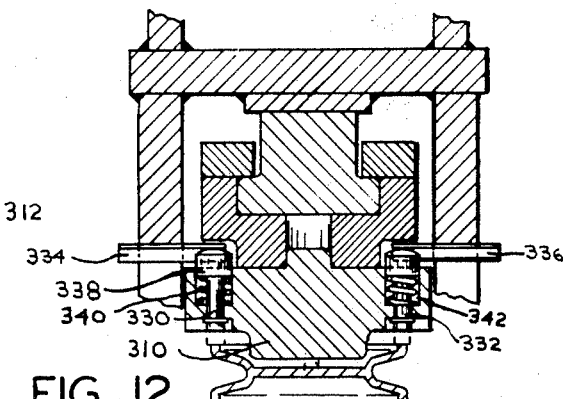
FIG. 12 is a vertical cross sectional view of the mechanism shown in FIGS. 9 and 10, the section being taken on line 12—12 of FIG. 10.
Figure 14:
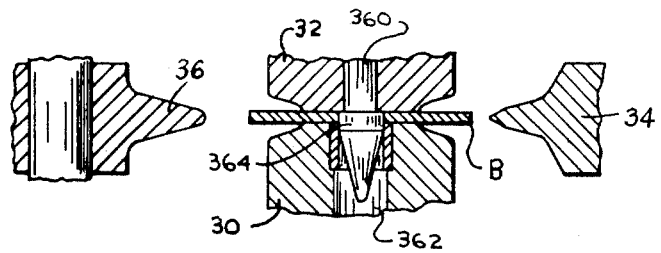
Figure 15:
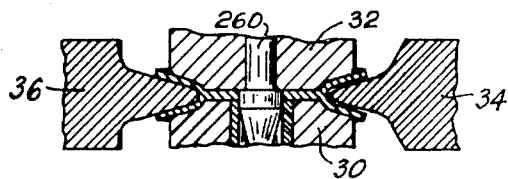
Figure 16:
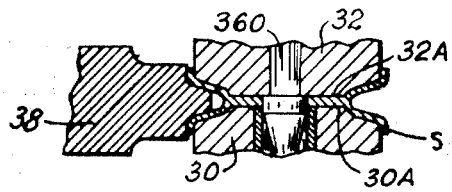

FIG. 13 is a fragmentary elevational and phantom view of the mechanism shown in FIG. 12; and FIGS. 14, 15, 16, 17 and 18 are vertical cross sectional views of the present pulley or sheave fabricating mechanism, shown principally in cross section and illustrating the various steps performed by the splitter, spreader and forming tools, the sections for the various figures being taken on line 14—14 of FIG. 9.

Referring more specifically to the drawings and to FIGS. 1 through 4, numeral 20 designates the present pulley and sheave fabricating machine generally, 22 a base, and 24 a head secured to said base. The base and head consist in part of external panels enclosing various operating mechanisms which will be described in more detail hereinafter. In the method performed by the present machine, a disc-shaped blank is clamped between two rotating members and by progressive, overlapping steps, the peripheral edge is split, the flanges formed by the split portion being spread outwardly simultaneously with the splitting operation, and the flanges near the end of the fabricating operation being formed to the desired final configuration. In the present machine, a disc-shaped blank is inserted in the machine, and the three forming tools are progressively and simultaneously advanced in overlapping relationship to perform the three foregoing operations. The pulley or sheave fabricated by the present machine is provided with a hub, either formed in or joined rigidly to the center portion of the disc-shaped blank after the fabricating operation.

The primary operating mechanism consists of head and tail spindles 30 and 32 mounted in the machine illustrated in the drawings in vertical relationship, spindle 30 being rotatable but fixed with respect to translatory movement, and tail spindle 32 being rotatable and also reciprocable toward and away from head spindle 30 as a blank is inserted therebetween and a formed pulley or sheave removed therefrom. The faces 30A and 32A of the head and tail spindles are contoured to the shape of the side of the formed sheave or blank S. The blank B held by head and tail spindles 30 and 32 at station 33 is formed into the sheave by a splitting tool 34, spreader tool 36 and forming tool 38 mounted on carriers 40, 42 and 44, respectively. The tools are rotatable and rotate while they are performing the forming operation, but they are not normally power driven aside from the power required to produce rotation so that instant forming takes place as soon as the tool engages the periphery of the blank.

Figures 1, 6:
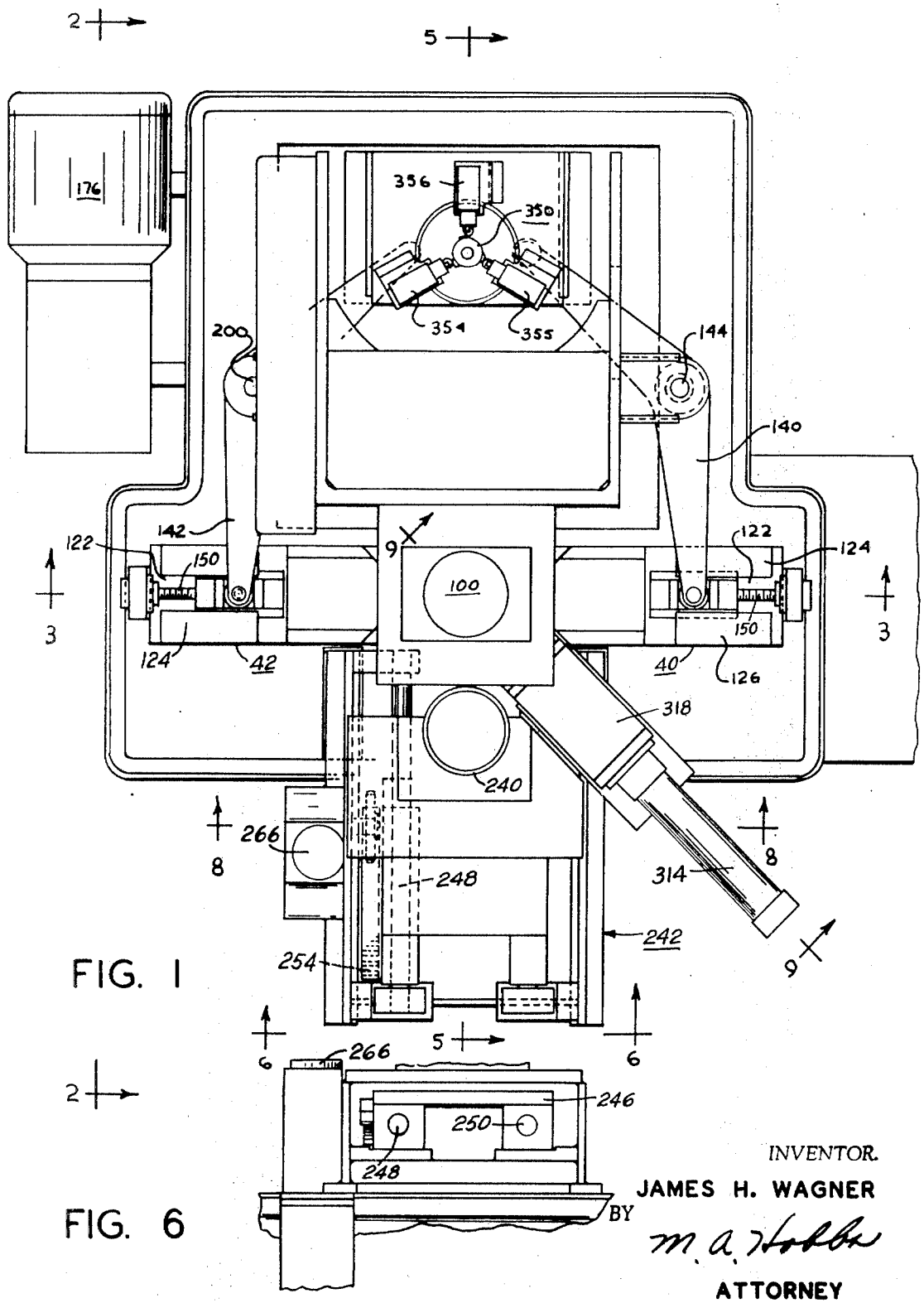
FIG. 1 is a top plan view of the present pulley or sheave fabricating machine.
FIG. 6 is a fragmentary elevational view of a portion of the machine.
Figure 3:
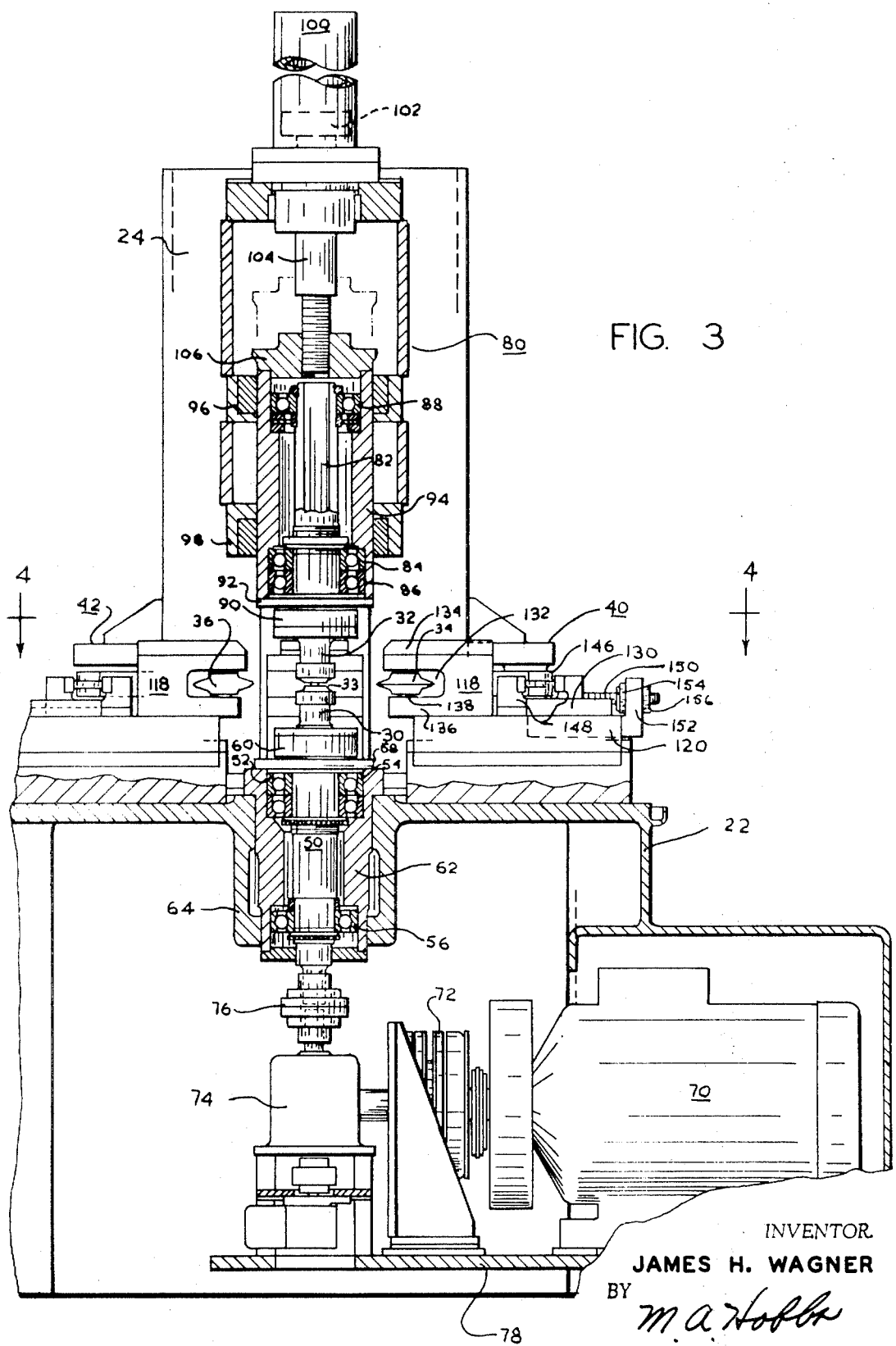
FIG. 3 is a vertical cross sectional view of the present machine, the section being taken on line 3—3 of FIG. 1.
Figure 4:
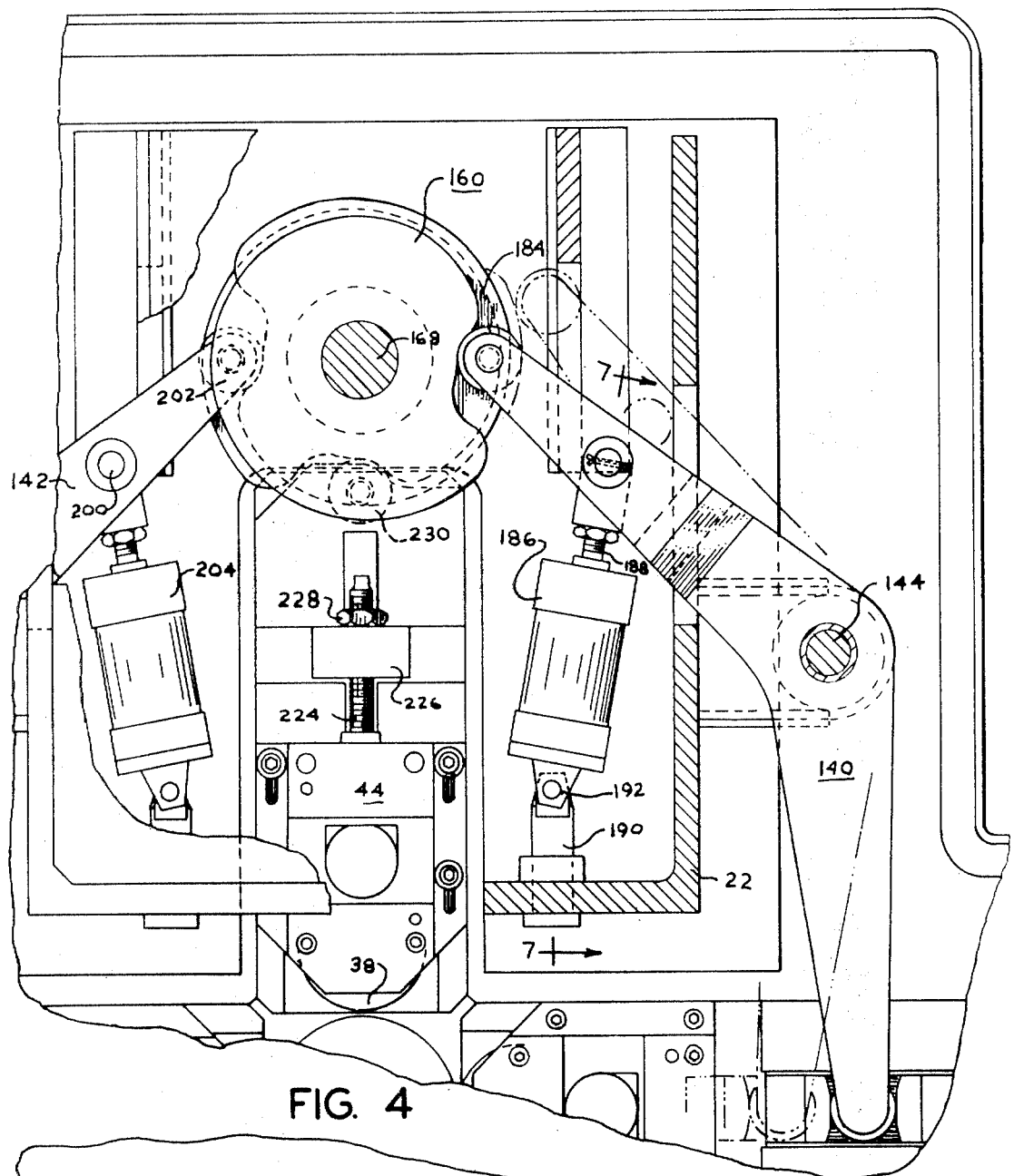
FIG. 4 is a horizontal cross sectional view taken on line 4—4 of FIG. 3.
Figure 7:
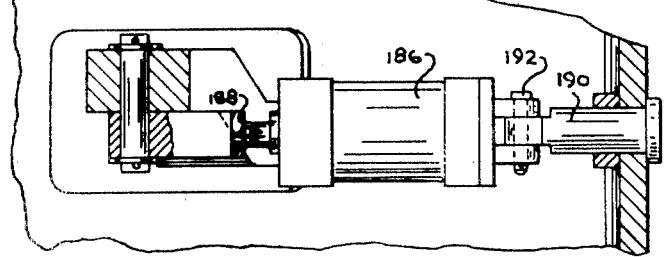
FIG. 7 is a fragmentary partial cross sectional view of the present machine, the section being taken on line 7—7 of FIG. 4.

The primary drive for head and tail spindles 30 and 32 and the disc-shaped blank clamped therebetween is seen in FIG. 3, consisting of a main shaft 50 mounted in bearings 52 and 54 at the upper end and bearing 56 near the lower end. The upper end of the shaft is provided with a collar 58 having a flange on the lower side for engaging bearing 52 and giving axial support to shaft 50. Spindle 30 is joined to the shaft by a coupling structure 60 mounted on the upper end of the shaft and rigidly supporting the head member. The three bearings are supported in an adapter 62, which in turn is rigidly supported in sleeve 64 formed as an integral part of the casting constituting base 22. The shaft 50 is driven by a motor 70 through coupling 72, speed reducer 74, and coupling 76, the speed reducer and motor being mounted on platform 78 of base 22. The speed of shaft 50 and the head and tail spindles 30 and 32 may be varied from one pulley or sheave fabricating operation to another in order to obtain optimum operating speeds of the disc-shaped blank.

While in the embodiment illustrated herein the head and tail spindles are positioned on a vertical axis, they may be positioned on a horizontal axis and the head spindle may be withdrawn from the tail spindle while the tail spindle remains in fixed translatory position, or both the head and tail spindles may be moved axially to open and close station 33 when receiving blanks and discharging formed articles.

Tail spindle 32 is retracted from head spindle 30 by a hydraulic cylinder mechanism 80 supported on head 24, the tail spindle being rotatably supported by shaft 82 journalled in bearings 84 and 86 at its lower end and in bearing 88 at its upper end. The spindle 32 is connected to the shaft by a coupling 90 and a collar 92 which transmits the axial force onto bearing 86. The three bearings are journalled in a sleeve 94 which is secured in the lower portion of the hydraulic cylinder mechanism by annular supports 96 and 98 at the upper and lower ends of sleeve 94, sleeve 94 reciprocating vertically in support members 96 and 98 between the position shown in FIG. 3 in full lines and the position shown in broken lines. A hydraulic operating cylinder 100 is mounted on the upper end of mechanism 80 and contains a piston 102 connected to sleeve 94 by a shaft 104 and end member 106 into which the lower threaded end of shaft 104 is secured. Hydraulic cylinder 100 has a two-way hydraulic operation moving the piston 102, shaft 104, sleeve 94 and head 32 vertically in a reciprocating movement to clamp the blank in and release it from forming station 33.

The splitting and spreading tools 34 and 36, respectively, are mounted on carriers 40 and 42 which are identical in construction and operation, and hence, only one will be described in detail herein. Head 118 is mounted on a bed 120 having a longitudinal groove 122 formed by tracks 124 and 126 along each side. The head is adapted to reciprocate on the two tracks toward and away from head and tail spindles 30 and 32. A carriage 130 is secured to head 118 and reciprocates on tracks 124 and 126 and in groove 122. Head 118 contains a slot 132 forming a yoke for receiving splitting tool 34, and the two side arms 134 and 136 support a shaft 138 on which the forming tool is journalled.

The splitting and forming tools 34 and 36 are operated by pivoted arms 140 and 142, respectively, the two arms being operated in the same manner to perform the reciprocating movement of the respective tool toward and away from the disc-shaped blank. Arm 140 is pivoted on vertical shaft 144 near the center of the arm, and the forward end of the arm is connected to carriage 130 by a roller 146 seated in a yoke 148 mounted on carriage 130.

The yoke is adjustable forwardly and rearwardly with respect to the carriage by a screw 150 threadedly supported by member 152 and nuts 154 and 156, the two nuts being loosened when the threaded shaft 150 is shifted to adjust the position of yoke 148 and head 118, and the nuts thereafter being tightened to hold the yoke and head in their adjusted position. Movement of yoke 148 toward and away from member 152 results in the adjustment of head 118 toward and away from station 33 and thereby varies the depth to which the splitting tool 34 will travel in splitting the disc-shaped blank.

Arm 140 is operated to move the splitting tool inwardly toward and away from the blank held in head and tail spindles 30 and 32 by a cam mechanism 160 mounted on the rear of the machine and having a series of three cams 162, 164 and 166, mounted on a rotating shaft 168 journalled at its upper end by a bearing 170 and at its lower end by a bearing 172 rigidly supported in housing 174, the housing being in turn rigidly mounted on base 22. The three cams are secured to and rotate with shaft 168 and are driven through the shaft by a motor 176 mounted on base 22 and connected to the shaft by a second shaft 178, a speed reducer 179, coupling 180 and shaft 182, the speed reducer being placed between the motor and shaft 182 to give a relatively slow rotation of the three cams. Roller cam follower 184 is rotatably mounted on the rear end of arm 140 and rides on the cam surface of cam 162 to control the movement of carriage 130 and head 118 toward and away from the blank in station 33. The cam follower is urged against the cam surface by an air cylinder unit 186, the unit being connected by conduits to a source of compressed air and consisting of a piston connected by shaft 188 to arm 140. The unit is connected to base 22 by a fixture 190 and pivotal connection 192. The details of the type of air unit shown in the drawings are well known and will not be described in detail herein. The large diameter or protruding portions on the cam and the inclined portions connecting the protruding portions with the recessed portions produce the necessary force for urging the splitting tool inwardly into the peripheral edge of the disc-shaped blank being clamped between and rotated by head and tail spindles 30 and 32. The cam follower 184 rides on the cam surface from the recessed portion which represents the position of the carriage when fully retracted, to the protruding portion, illustrated by the broken lines of arm 140 and cam 162 which represent the position when the splitting tool has reached its maximum depth or travel.

Arm 142 is mounted on pivot pin 200 and is provided with cam follower 202 for riding on the periphral surface of cam 164. The contour of cam 164 is similar to the contour of cam 162, but the action of the cam on the movement of arm 142 is such that tool 36 is advanced and retracted following the advance and retraction of tool 34, but the movement of tool 36 overlaps a substantial portion of the cycle of the movement of tool 34. Cam follower 202 is urged inwardly against the peripheral surface of cam 164 by an air unit 204 connected at one end to the arm and anchored at the other end to frame 22 in the same manner as air cylinder unit 186. The construction of arm 142 and the operation thereof on carrier 42 are the same as the structure and operation of arm 140, and hence will not be described in further detail herein.

Forming tool 38 is rotatably supported on carrier 212 having a head 214 with arms 216 and 218 forming a yoke 220 in which the forming tool 38 is mounted on a shaft supported by the two arms. The head 214 is adjusted on carriage 222 of the carrier 212 by a threaded shaft 224 connected at one end to head 214 and threadedly received in a member 226. The threaded shaft 224 in member 226 is held in its adjusted position by a nut 228 threaded onto the end of the shaft and seating against member 226. The carriage 222 on which head 214 is mounted is moved toward and away from the blank by cam 166 acting on cam follower 230 which is rotatably supported on the rear end of carriage 222. Cam 166 is so contoured and timed with respect to cams 162 and 164 that the movement of tool 38 follows the advance of tool 36 and engages the partially formed blank B near the completion thereof to perform a final forming operation, such as expanding the flanges formed by the splitting and spreading operation, or rolling the laterally extending peripheral beads on the newly formed flanges. Carriage 222 is retracted and cam follower 230 is held in engagement with the peripheral surface of cam 166 by an air unit 232 mounted on the underside of carriage 222 and having a shaft 234 which is urged by the air acting on the piston in the unit into engagement with a member of base 22, thereby exerting a force in the direction to withdraw the forming tool from station 33.

Figure 5:
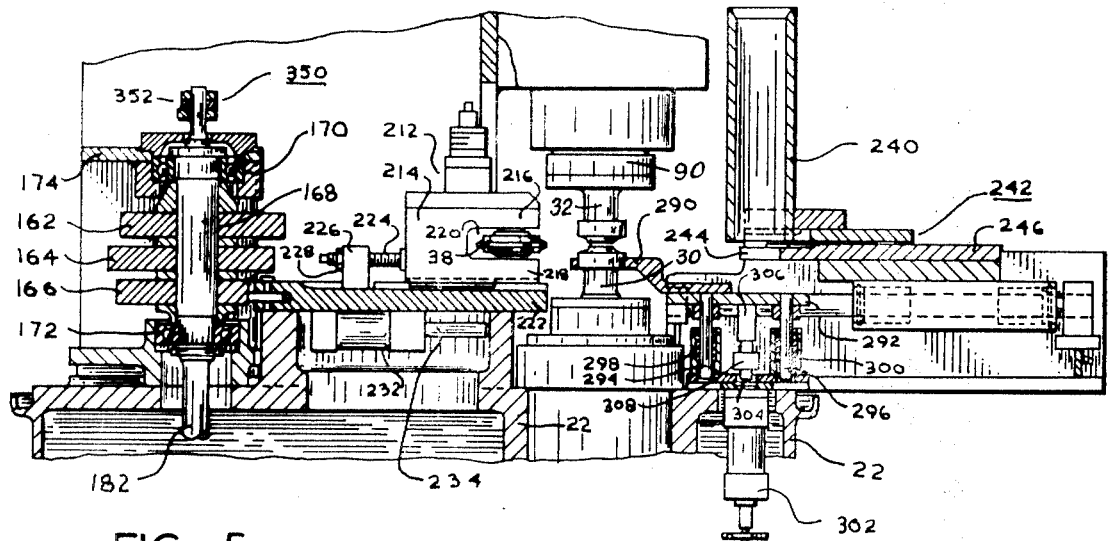
FIG. 5 is a fragmentary vertical cross sectional view of the machine taken on line 5—5 of FIG. 1.
Figure 8:
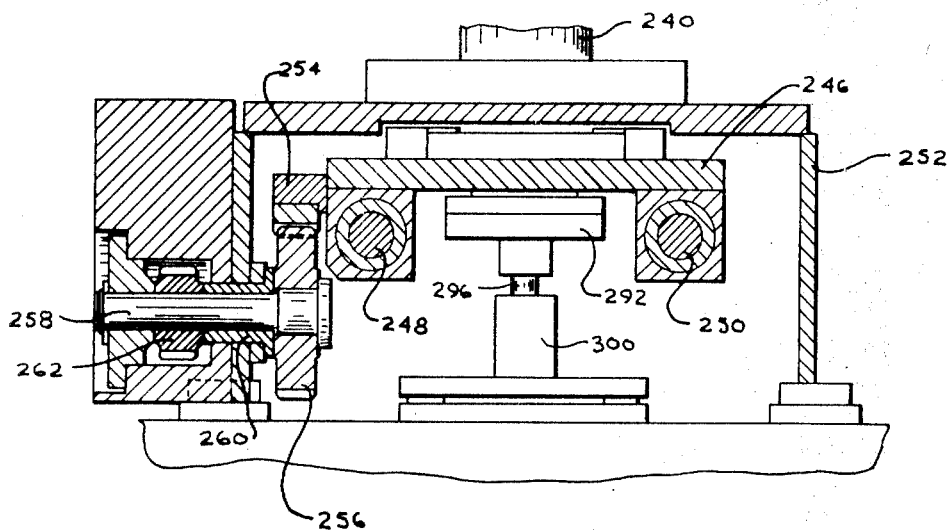
FIG. 8 is a vertical cross sectional view of a portion of the drive mechanism of the machine, the section being taken on line 8—8 of FIG. 1.
Figure 10:
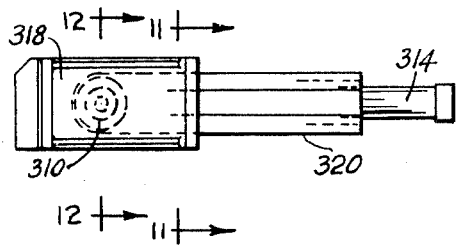
FIG. 10 is a top plan view of a portion of the mechanism shown in FIG. 9.

The sheaves are made from disc-shaped blanks fed into station 33 between head spindle 30 and tail spindle 32 from a magazine 240 mounted on the feeder mechanism 242 in the front part of the machine. A blank pick-up device 244 is mounted on a reciprocable carriage 246 which is journalled on two rod-like tracks 248 and 250 supported in housing 252, the housing being secured to and supported by base 22. The blank pick-up device consists of two resilient fingers which engage the periphery of the blank and hold it while carriage 246 is moved from the position shown in FIG. 5 to the left to a position where the blank is disposed directly between head and tail spindles 30 and 32. The carriage is moved between the loading and unloading positions by a rack and pinion 254 and 256, the rack being welded or otherwise secured to the side of carriage 246. The pinion is mounted on a shaft 258 journalled in bearing 260 which in turn is supported in the side of housing 252. A pinion 262 is mounted on shaft 258 and keyed thereto for rotation therewith, and is operated by a rack 264 reciprocating in sleeve 266 in the side of housing 252. Rack 264 is reciprocated to rotate pinion 262 and shaft 258 by an air cylinder 270 supported by a frame 272 on the lower side of housing 252. The piston rod 274 of cylinder 270 is connected to the lower end of rack 264 by a coupling 276 and adjustable shaft 278, the latter shaft being adjustable to permit the effective stroke of air cylinder 270 to be adjusted and thereby provide the desired travel of carriage 246. When piston rod 274 is moved upwardly by the operation of air cylinder 270, rack 264 rotates pinion 262 and shaft 258, thereby rotating pinion 256 and moving rack 254 to move carriage 246 to the left, as viewed in FIG. 5, causing device 244 to displace the bottom blank from the magazine 240 and position it between the head and tail spindles 30 and 32. After the head and tail spindles have closed, the air cylinder is operated in the opposite direction to reverse the various racks and pinions just described to return carriage 246 to its initial starting position as shown in FIG. 5. The magazine and devices 240 and 244 can readily be changed to accommodate blanks of various sizes in making different diameter sheaves.

The formed sheave is removed from station 33 after tail spindle 32 has been withdrawn vertically from head spindle 30 by a mechanism illustrated in FIGS. 5 and 10 through 13. In order to initially dislodge the pulley or the sheave from the head spindle, a collar 290 disposed around the head spindle is moved upwardly to engage the lower side of the sheave by an operating mechanism consisting of a plate 292 supported and guided by pins 294 and 296, the two pins being secured to the underside of plate 292 and journalled in bearings 298 and 300 mounted in the inner side of housing 252. The plate 292 is operated vertically to move collar 290 from the position shown in FIG. 5 to a raised position with respect to the inner end of head spindle 30 by an air cylinder 302 mounted on frame 22 and connected to plate 292 by a piston rod 304, shaft 306 and coupling 308. When carriage 246 is in its advanced position, it bridges plate 292, as can be clearly seen by the relative positions of plate 292 and the upper part of carriage 246.

While collar 290 is holding the formed sheave blank in its elevated position disengaged from head spindle 30, a magnet 310 supported by carriage 312 moves beneath tail spindle 32, and automatically lifts the formed sheave in the manner illustrated in FIG. 12, the carriage 312 being moved between its sheave pick-up position and its discharge position by an air cylinder 314 mounted on brackets 316 and 318, the latter bracket being supported by head 24. Carriage 312 reciprocates on tracks 320 supported by bracket 318 and carries the formed sheave directly above a chute 322 for discharge from the machine, the chute 322 being supported on base 22 by a bracket 324. The cylinder 314 is connected to carriage 312 by a piston rod 326 and lug 328. The formed sheave is disengaged from a permanent magnet 310 by two reciprocating pins 330 and 332 mounted in the magnet and being urged in the direction to disengage the sheave by cam members 334 and 336 when the carriage approaches its fully withdrawn position. A head 338 on each pin engages the respective cam member and the pin is thereby moved downwardly sufficiently to release the sheave and the pins are returned to their inoperative position by coil springs 340 reacting between the head on the respective pins and the end of recess 342 in the magnet body.

The sequence of the fabricating operation referred to herein is illustrated in FIGS. 14 through 18, and the sequence of operation for the entire machine, including the loader and unloader mechanisms is controlled by control device 350 mounted on and operating in conjunction with cam mechanism 160. The control device 350 controls the electrical and power systems which by various relays and valves perform the operations of loading, splitting, spreading, forming and unloading the machine. Various types of relays and valves may be used and the particular electrical system is not considered significant as far as the inventive concept is concerned, since different arrangements of the electrical circuit and components are possible. Control mechanism 350 is provided with a series of cams 352 for operating controls 354, 355 and 356 which in turn through the control circuitry, control the various operating mechanisms of the machine.

In order to center the blank when it is initially placed in the machine between the head and tail spindles 30 and 32, a tapered centering pin 360 is mounted in the center of tail spindle 32 and projects downwardly into bore 362 in head spindle 30. The large diameter portion 364 of the pin is substantially the same size as the center hole of the blank. In order to prevent the formed sheave from clinging to tail spindle 32 when it is withdrawn from head spindle 30, an oil breaker 366, consisting of an oil line 368 and a valve 370, injects oil between the tail spindle and the sheave to disengage the sheave from the tail spindle, thereby permitting it to remain on the upper surface of head spindle 30, to be removed therefrom by the unloading mechanism, previously described herein.

In the operation of the present pulley or sheave fabricating machine, a stack of disc-shaped blanks having perforated centers is placed in magazine 240. With tail spindle 32 withdrawn from head spindle 30 by cylinder 100, the loading mechanism advances pick-up device 244 which engages the lower blank in the magazine, carrying it to station 33 directly between the head and tail spindles. The tail spindle then advances downwardly and centering pin 360 passes through the center hole of the blank aligning the blank with the axis of the head and tail spindles, and the loader mechanism is then withdrawn to its original position, as shown in FIG. 5. With the blank firmly clamped between the head and tail spindles, the splitting tool is advanced by cam 162, which pivots arm 140 and moves carriage 130 and head 118 inwardly to the blank being rotated by the head and tail spindles. After the splitting tool has entered the peripheral margin of the blank, cam 164 pivots arm 142 to advance head 118 and spreader tool 36 into contact with the flanges formed by the splitting operation, as illustrated in FIGS.

14 and 15. The spreader tool engages the flanges and presses the flanges outwardly simultaneously with the further advancing of the splitting tool, thereby greatly facilitating the splitting operation and placing a counter-force on the blank and head and tail spindles and the respective shafts, thereby reducing or relieving the excessive pressure placed on those parts by the splitting tool. This counter-force, applied simultaneously with the force of the splitting tool, very substantially increases the life of the head and tail spindles and the respective shafts, as well as increasing the accuracy of the splitting, spreading and forming operations. After the splitting and spreader tools have at least partially completed their operations, forming tool 38 is advanced by cam 166, and, in the operation illustrated in FIG. 16, forms the laterally extending beads, pressing the flanges of the blank firmly against the contoured adjacent faces 30A and 32A of the head and tail spindles 30 and 32, respectively.

Figure 17:
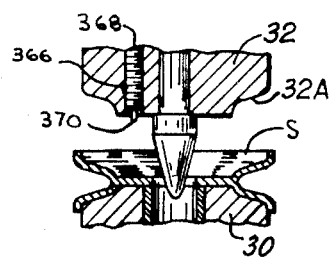
Figure 18:
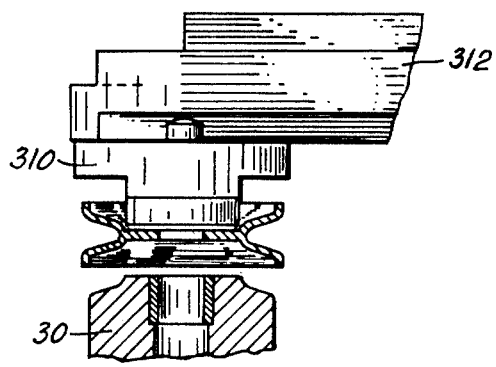

After the splitting, spreading and forming operations have been completed, the rotating cams arrive at the recessed portion, thereby permitting air cylinders 186, 204 and 232 to retract the respective tools from the formed blank, and hydraulic cylinder 100 withdraws the tail spindle 32 from the head spindle 30, thereby releasing the formed blank, as illustrated in FIG. 17. At this stage of the operation, air cylinder 302 is operated to raise plate 292 and collar 290 to lift the formed sheave from the head spindle. As this operation is taking place, carriage 312 advances, carrying permanent magnet 310 to a position directly above the head spindle and the formed blank, the magnet lifting the blank from collar 290 and holding it in suspended position, as shown in FIG. 18. Air cylinder 314 is then reversed, retracting carriage 312 to its position over chute 322 where cam members 334 and 336 acting through pins 330 and 332 disengage the formed blank from the magnet, permitting it to fall into the chute and to be discharged from the machine. Upon the completion of the full sequence, as just described, the next cycle is started with the advance of carriage 246 to place the next disc-shaped blank in station 33 for repeating the forming operation.

While only one embodiment of the present invention has been described in detail herein, various changes and modifications may be made without departing from the scope of the invention.

We claim:
1. In a machine for fabricating pulleys, sheaves and like articles from disc-shaped blanks with a center hole, said machine having rotatable head and tail spindles disposed in vertical axial position, said head spindle being fixed with respect to translatory movement and said tail spindle being positioned above said head spindle and movable axially relative thereto: the combination of a magazine for holding disc-shaped blanks, a reciprocating device movable between said magazine and said spindles for delivering said blanks to said spindles, a collar disposed around said head spindle movable axially thereon for disengaging the formed blank from said spindle and having an upper surface for loosely supporting said disengaged blank with said blank lying on said surface in axial alignment with the axis of said spindles, a permanent magnet for lifting said formed blank axially from said collar, a carriage means for supporting said magnet and moving said formed blank from between said spindles to a discharge station, and means including two plunger pins and cams operating said pins for disengaging said formed blank from said magnet at said discharge station.

2. In a machine for fabricating pulleys, sheaves and like articles, having rotatable head and tail spindles disposed in vertical axial position, said head spindle being fixed with respect to translatory movement and said tail spindle being positioned above said head spindle and movable axially relative thereto: a magazine for holding disc-shaped blanks, a device movable between said magazine and said spindles for delivering said blanks to said spindles, a collar disposed around said head spindle movable axially thereon for disengaging the formed blank from said spindle and having an upper surface for loosely supporting said disengaged blank with said blank lying on said surface in axial alignment with the axis of said spindles, a permanent magnet for lifting said formed blank axially from said collar, a carriage means for supporting said magnet and moving said formed blank from between said spindles to a discharge station, and means including a cam for disengaging formed blanks from said magnet at said discharge station.

3. In a machine for fabricating pulleys, sheaves and like articles, having rotatable head and tail spindles movable axially relative to one another; a collar disposed around said head spindle movable axially thereon for disengaging the formed blank from the spindle and having an upper surface for loosely supporting said disengaged blank with said blank lying on said surface in axial alignment with the axis of said spindles, a permanent magnet for lifting the formed blank axially from said collar, a carriage means for supporting said magnet and moving said formed blank from between said spindles to a discharge station, and means for disengaging said formed blank from said magnet at said discharge station.

4. In a machine for fabricating pulleys, sheaves and like articles, having rotatable head and tail spindles movable axially relative to one another: a collar disposed around said head spindle movable axially thereon for disengaging the formed blank from the spindle and having an upper surface for loosely supporting said disengaged blank with said blank lying on said surface in axial alignment with the axis of said spindles, a magnet for lifting the formed blank axially from said collar, and a carriage means for supporting said magnet and moving said formed blank from between said spindles to a discharge station.

References Cited

UNITED STATES PATENTS 2,578,733 12/1951 Nordquist et al. _____ 198—41
3,222,765 12/1965 Parent et al. _____ 29—159.1
3,370,447 2/1968 Skinner _____ 29—159.01 X CHARLES W. LANHAM, Primary Examiner M. J. KEENAN, Assistant Examiner U.S. Cl. X.R.
29—159.01